US010366412B1

(12) United States Patent
Ross et al.

(10) Patent No.: US 10,366,412 B1
(45) Date of Patent: Jul. 30, 2019

(54) SYSTEMS AND METHODS FOR ASSESSING PROTECTION NEEDS OF RETIREMENT SERVICES CLIENTS AND DETERMINE CROSS-SELLING POTENTIAL OF CUSTOMERS

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 756 days.

(21) Appl. No.: 14/577,346

(22) Filed: Dec. 19, 2014

Related U.S. Application Data (60) Provisional application No. 61/922,124, filed on Dec. 31, 2013, provisional application No. 61/921,686, filed on Dec. 30, 2013.

(51) Int. Cl.
   *G06Q 30/02* (2012.01)

(52) U.S. Cl.
   CPC ..... *G06Q 30/0255* (2013.01); *G06Q 30/0276* (2013.01)

(58) Field of Classification Search
   None
   See application file for complete search history.

(56) References Cited

U.S. PATENT DOCUMENTS

| | | | |
|---|---|---|---|
| 6,925,441 B1 * | 8/2005 | Jones, III | G06Q 10/06375 705/7.33 |
| 2010/0256996 A1 * | 10/2010 | Gerber | G06Q 40/06 705/4 |
| 2014/0351166 A1 * | 11/2014 | Schlossberg | G06Q 40/06 705/36 R |

OTHER PUBLICATIONS

Y. Kim and W. Street. An intelligent system for customer targeting: a data mining approach. Elsevier, vol. 37, Issue 2. May 2004. pp. 215-228. See https://www.sciencedirect.com/science/article/pii/S0167923603000083 (Year: 2004).*

* cited by examiner

*Primary Examiner* — Sam Refai
*Assistant Examiner* — Christopher C Busch
(74) *Attorney, Agent, or Firm* — Eric L. Sophir; Dentons US LLP (57) ABSTRACT

Methods and systems determine the protection needs and cross-selling capability to RS clients. A retirement protection system includes one or more software modules that interact with each other and are used to determine and identify the protection needs of high propensity clients, and develop strategies to cross-sell annuity/life products to those clients. The retirement protection system includes different components which may be implemented through one or more software modules running on a computing device. The retirement protection system involves the analysis of a sample of RS clients to determine cross selling capability of life, disability income, and annuity products. Additionally, the retirement protection system implements an experimental approach to pilot and refine the direct marketing model in order to create campaigns for high propensity target clients or groups. The retirement protection system provides an access transaction capability and an ongoing service to those high propensity clients in order to cross-sell annuity or life products.

15 Claims, 6 Drawing Sheets

SYSTEMS AND METHODS FOR ASSESSING PROTECTION NEEDS OF RETIREMENT SERVICES CLIENTS AND DETERMINE CROSS-SELLING POTENTIAL OF CUSTOMERS

CROSS-REFERENCE TO RELATED APPLICATIONS

This application claims priority to U.S. Provisional Patent Application Ser. No. 61/921,686, filed Dec. 30, 2013, and U.S. Provisional Patent Application Ser. No. 61/922,124, filed Dec. 31, 2013, which are hereby incorporated by reference in their entirety.

TECHNICAL FIELD

The present disclosure relates in general to insurance products, and more specifically, to systems for assessing the protection needs and determining cross-selling potential of retirement service policyholders.

BACKGROUND

Different individuals have different financial goals for retirement. Individuals often prepare for retirement by first determining a desired retirement income and then preparing a plan to achieve the desired retirement income. Typically, desired retirement income can be anywhere between 40%-80%, or more, of the pre-retirement income for the life of the individual. Examples of retirement savings vehicles include annuities and life insurance products, among others.

Annuities allow investors to place a certain amount of money in a tax-deferred account in exchange for income in the future. Individuals who need additional income sources during retirement can invest in annuities. An annuity can also be an attractive investment if the customer is looking for a retirement account without contribution limits. Additionally, unlike some retirement accounts, customers are not required to take a minimum distribution from annuities at retirement age.

Life insurance provides a benefit to a policyholder's beneficiaries when the insured dies. Life insurance is needed by individuals to pay for the majority of their family expenses should they die. Life insurance can provide a policyholders' family the ability to pay for the policyholder's funeral expenses and maintain the family's standard of living. For example, a policyholder's family can continue to make mortgage payments and pay household expenses using the proceeds from a life insurance policy death benefit.

Planning for retirement is difficult due to the many seemingly conflicting goals and risks that a retiree faces. Retirees may have accumulated retirement savings well in excess of what is needed to provide for basic spending needs, but may be overly-cautious about spending it too quickly during the early years of retirement. This cautiousness might prevent them from fully enjoying traveling and other activities that are typically associated with the "golden years" of life. Maximizing the benefit from a given set of retirement assets can be difficult, particularly while taking into account a given retiree's tolerance for risk. Additionally, the traditional retirement planning approach often ignores retirement protection often focusing only on retirement funding.

One conventional approach involves the implementation of different tools by insurance companies in order to assess the customer needs in terms of protection for retirement services. Some of those tools may be focused on the level of protection provided to a customer's current financial state and typically addressed with life insurance. Interactive tools can be used for evaluating a customer's potential financial situation during retirement and how life insurance might affect a customer's financial situation. The evaluation of an individual's insurance protection is based on whether the protection is commensurate with the individual's current financial replacement value. However, the existing or conventional approaches and/or tools related to offer insurance protection based on customer needs are not effective or efficient enough.

For the aforementioned reasons, there is a need for an improved system and method to provide the protection needs of retirement services and to determine the cross-selling product capability of current insurance customers.

SUMMARY

A system and method for assessing the protection needs for retirement services and providing cross-selling products are disclosed. According to some embodiments, the present disclosure includes a system architecture of a retirement protection system, which is used to assess the protection needs of a retirement service customer (at an individual, not a work-site level), and to develop strategies to cross-sell life products to those customers. More specifically, the retirement protection system analyzes a sample of RS (retirement service) customers stored in a database to determine propensity of clients for acquiring cross-selling products (e.g. of life, disability income, and annuity products).

According to an embodiment, the system architecture includes different components that dynamically interact with each other through a network connection. The system architecture of the retirement protection system includes different components, such as a RS client data source, an internal database, an external database, a retirement service system, a marketing campaign module, an automated transaction platform, and an ongoing service module.

According to another embodiment, the present disclosure refers to a method for assessing protection needs and determining cross-selling propensity of RS clients. The method describes a process with multiple steps, where a retirement service system through a software module obtains a sample of RS clients from the RS client data source. The retirement service system includes different tools or software modules to determine a correlation between customers' needs for annuity/life cross-selling products and the propensity or probability for acquiring them. Subsequently, the retirement service system uses this correlation to identify high propensity clients for acquiring annuity/life cross-selling products. Then, the retirement protection system through the marketing campaign module creates a marketing campaign which includes a marketing strategy for targeting high propensity groups. The retirement service system also includes software modules for providing ongoing services to high propensity target groups. The ongoing service module includes functions such as, for example, automatic reminders to policyholders about payments due, discounts, customer feedback collection, and/or product offerings.

The disclosed retirement protection system and method are able to conduct advanced analytics to identify propensity of clients which may acquire a combination of annuity and life insurance products. In addition, the disclosed retirement protection system and method creates the opportunity to provide different services and/or products by developing a cross-selling strategy based on individual policyholders' needs. Tools for cross-selling life and annuity products allows insurers to have a diversified portfolio while increasing sales and creating value for clients.

In one embodiment, a computer-implemented method comprises selecting, by a server, a set of policyholder records from a policyholder database; determining, by the server, a life insurance and retirement need for each of the policyholders associated with the set of policyholder records; determining, by the server, a propensity for purchasing at least one selected product that satisfies the life insurance and retirement need for each of the policyholders associated with the set of policyholder records and assigning a value to the determined propensity for each policyholder; selecting, by the server, a subset of the set of policyholders that have the highest correlation between the propensity for purchasing and the life insurance and retirement need; and automatically generating, by the server, customized marketing correspondence to the subset of the set of policyholders based upon the propensity for purchasing and the life insurance and retirement need according to a marketing campaign.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

As used here, the following terms may have the following definitions:

"Life insurance" refers to a contract made with a life insurance company, but the focus is to provide a death benefit to the customer beneficiaries once it die. Life insurance contracts may be whole life or term life.

"Annuitization" refers to the process of converting an annuity into a series of periodic income payments.

"Annuity" refers to a contract between an insurance company and an annuity owner in exchange for a purchase payment, or series of purchase payments, which can provide income for life, for a specific period of time, or a combination of both. An annuity can play an important role in the retirement income strategy of policyholders by providing a guaranteed and predictable income stream etc.

"Agent" refers to an individual working for a company or as a broker with an interest in attracting new clients by analyzing their needs and wishes. An agent may specifically look for prospects with high referral potential. In addition, an agent may represent the intermediary between an issuing company and a client.

"Customer" or "client" refers to an individual paying a premium for insurance coverage against one or more potential risks.

"Issuing company" refers to the company that sells and services insurance policies.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Methods and systems for determining the protection needs and cross-selling capability of retirement services customers are disclosed. The present disclosure refers to a retirement protection system, which is tailored to the particular needs of retirement system (RS) clients. The protection needs for retirement services meets different aspects, such as, for example, retirement savings and withdrawals, healthcare, income protection, retirement assets, and beneficiaries, among others. The present disclosure also relates to a computer-implemented method for building tools for cross-selling life and annuity products to high propensity clients. Moreover, the protection or retirement protection in the present disclosure is assessed using a retirement protection system that includes one or more software modules which interact with each other and are implemented in a computing device. Additionally, the retirement protection system includes a plurality of databases that are used as input information coming from different sources and referred to employees' information (potential customers), product portfolio and retirement service, among others.

Figure 1:
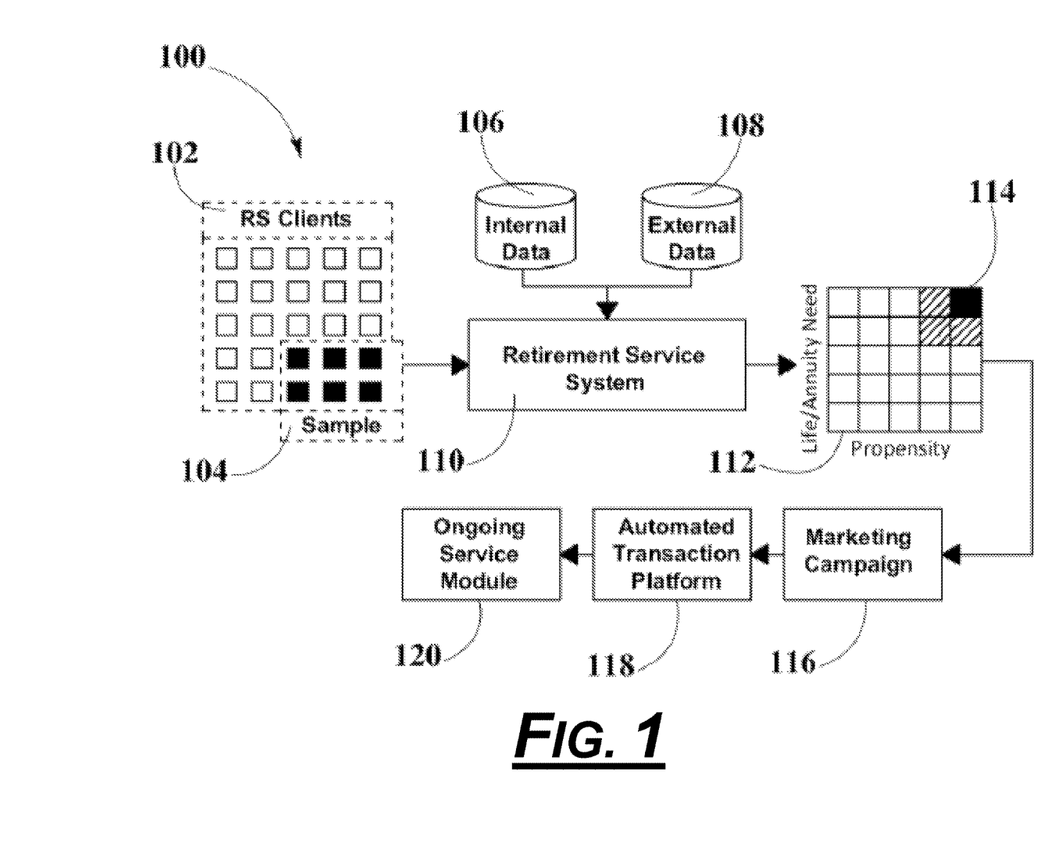
FIG. 1 is a block diagram illustrating a system architecture of a retirement protection system, according to an embodiment.

FIG. 1 is a block diagram illustrating a system architecture of a retirement protection system, according to an embodiment. In FIG. 1, system architecture 100 includes different components that interact with each other through a communication network, such as for example, RS client data source 102, internal database 106, external database 108, retirement service system 110, marketing campaign subsystem 116, automated transaction platform 118, and ongoing service module 120.

The components within system architecture 100, such as retirement service system 110, marketing campaign subsystem 116, automated transaction platform 118, and ongoing service module 120 are implemented as software modules comprising computer software that includes programmatic rules or logic for executing and otherwise running different analytic operations, where said operations are executed by a processing unit. The processing unit includes a processor with a computer-readable medium, such as a random access memory (RAM) coupled to the processor. Examples of processor includes a microprocessor, application specific integrated circuit (ASIC), and field programmable object array (FPOA), among others.

In one embodiment, software modules in the system architecture 100 are implemented within computing devices, such as for example, desktop, laptops, tablets, smart phones, server computers, and the like.

In another embodiment, a communication network can facilitate the interaction between each component of system architecture 100. The communication network may be implemented as any type of hardware, software, and/or firmware that interconnect and otherwise couples computing devices together to allow effective communication between the components of system architecture 100. Network communications include intranets, local area networks (LAN), virtual private networks (VPN), wireless area networks (WAN) and the World Wide Web, among others.

In one embodiment, retirement service system 110 selects sample 104 of RS clients (policyholders) using programmatic logic or rules from RS client data source 102. Further to this embodiment, retirement service system 110 conducts advanced analytics to determine high propensity clients 114 for acquiring cross-selling insurance products (e.g. of life, disability income, and annuity products), among others.

In one embodiment, retirement service system 110 is implemented as one or more computer software modules that include programmatic rules or logic for executing/running different analytic operations to determine if a client needs life insurance, disability income, or annuity products based on economic, demographic or health aspects. For instance, annuities pay a set amount monthly, quarterly or annually to meet future financial needs, usually in retirement. Life insurance pays the value of the policy at the time of policyholder death. In this example, annuities are beneficial to policyholders who desire guaranteed income for life. The rate of return on annuities is typically higher than certificates of deposit or government securities. Tax advantages are another benefit that makes annuities attractive to some potential policyholders. Potential policyholders can benefit from life insurance if they have specific goals to reach even after death. For example, policyholders' families can use the death benefit to send the children to college or pay estate taxes.

In one embodiment, retirement service system 110 receives data from internal database 106 and external database 108. Internal database 106 includes data related to an insurance or financial company, including data about cross-selling plans, and other insurance services or products. In another embodiment, internal database 106 includes data policyholders' financial and customer history. Yet in another embodiment, internal database 106 also includes reports having questions about specific insurance products answered directly by clients. External database 108 includes data related to clients which can be obtained from outside data sources such as for example, the internet, social networks, and the like.

In FIG. 1, internal database 106 and external database 108 are implemented as a relational databases that receive information, store said received information, and retrieve and provide said information to authenticated requestors. In some embodiments, internal database 106 and external database 108 are implemented through database management systems (DBMS) such as for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that organize collections of data.

In some embodiment, retirement service system 110 selects a sample 104 of RS clients (policyholders) from RS client data source 102 using content-based systems and/or collaborative filtering techniques. Examples of collaborative filtering techniques include K-Nearest Neighbor (KNN.

Additionally, an algorithm such as stochastic gradient descent (SGD) may be used by retirement service system 110 to train an analytical model for insurance needs analysis. In addition, retirement service system 110 includes a database or any other storage mechanism (not shown in FIG. 1) for storing sample 104 of RS clients associated with life/annuity cross-selling products.

According to another embodiment, retirement service system 110 is also used to segment policyholder, identify value, and carry out needs assessments, as well as, to create non-commissioned products for high propensity target market groups.

In one embodiment, retirement service system 110 determines the needs of RS clients for purchasing existing life/annuity products according to specific characteristics of the sample of RS clients. For example, the need for a particular life/annuity product may be determined according to RS client's characteristics such as demographics, professional background, medical and financial history.

In some embodiments, retirement service system 110 determines the amount of life insurance that a particular RS client may need. In these embodiments, retirement service system 110 determines the amount of life insurance that particular RS client needs based on data such as income, amount of debt, number of family dependents, savings, monthly family expenditures, and the like. In other embodiments, retirement service system 110 can also take into account trends or fluctuations in inflation and interest rates in order to approximate the amount of life insurance that a particular RS client may need. In one example, retirement service system 100 estimates a higher amount of life insurance for a person having a family with of 5 children and with monthly expenditures of $15,000 as compared to a person having a family with only 1 kid and with monthly expenditures of less than $5,000.

In some embodiments, retirement service system 110 determines the amount of annuity or pension that a particular RS client may need. In these embodiments, retirement service system 110 determines the amount of annuity that a particular RS client needs based on age, gender, postal code, occupational background, monthly expenditures, income, retirement plan, medical history, marital status, and the like. Further to these embodiments, retirement service system 110 approximates the lump sum required to fund an annuity to meet certain retirement needs. In an example, retirement service system 110 determines a higher annuity requirement for a RS client that does not have an existing 401k plan. In another example, retirement service system 110 determines a higher annuity requirement for a RS client having considerable monthly expenditures for covering a long-term disease.

In one embodiment, the retirement service system 110 determines the propensity of RS clients for purchasing existing life/annuity products. In one embodiment, the retirement service system estimates the propensity of RS clients for purchasing existing life/annuity products according to life events. Examples of life events include the birth of a child, birthday, marriage, accidents, diseases, death of relatives, and the like.

In one embodiment, retirement service system 100 performs a correlation 112 between the need of cross-selling life/annuity products and the propensity of clients for acquiring life/annuity cross-selling products. In one embodiment, correlation 112 identifies high propensity clients 114 according to their propensity or probability for buying life/annuity cross-selling products. For example, a younger client having a life policy may have more propensity to buy annuities in order to obtain the extra income to maintain a living standard, compared to an older client that may not have enough time to take advantage of annuitization.

In some embodiments, marketing campaign sub-system 116 in system architecture 100 is implemented as one or more computer software modules that include programmatic rules or logic for executing/running different analytics operations to automatically develop marketing strategies in order to reach high propensity target groups and offer them cross-selling products depending on their identified needs. For example, marketing campaign sub-system 116 may automatically send emails to high propensity clients 114 offering life/annuity products according to their needs. In another embodiment, marketing campaign sub-system 116 can use automatic telemarketing campaigns and/or targeted advertisement over social media to reach high propensity clients 114.

In some embodiments, automated transaction platform 118 in system architecture 100 is implemented as one or more computer software modules that include programmatic rules or logic for executing/running different analytics operations, which allows propensity clients 114 to purchase products or cross-selling products from an issuing company. Automated transaction platform 118 includes a graphical user interface from where customers can view and purchase available cross-selling products. For example, automated transaction platform 118 may be implemented as a website from where the customers can access and buy life/annuity products offered by the issuing company.

In some embodiments, system architecture 100 further includes an ongoing service module 120 that is implemented as one or more computer software modules that include programmatic rules or logic for executing/running different analytics operations, used to track business relations between high propensity clients 114 and the insuring company. In one embodiment, ongoing service module 120 tracks post sale activities such as reminding high propensity clients 114 about renewals, collecting renewal premiums, ensuring the customer receives the receipts on time, analyzing purchase activities, and tracking new needs developed high propensity clients 114. In another embodiment, ongoing service module 120 collects feedback from reengaged policyholders in the form of surveys or frequently asked question services and/or any method of collecting feedback.

Each module within the retirement protection system may be a set of computer instructions executed by central processing units that run computer executable program instructions or related algorithms. Each central processing unit may be a component of computing devices such as a server, a single computer, or multiple computers in a distributed configuration, as shown in FIG. 2.

Users may interact with the retirement protection system through a user interface using client computing devices. A user interface may be configured for supporting the interaction between the software modules or tools operating within retirement protection system and one or more users.

Figure 2:
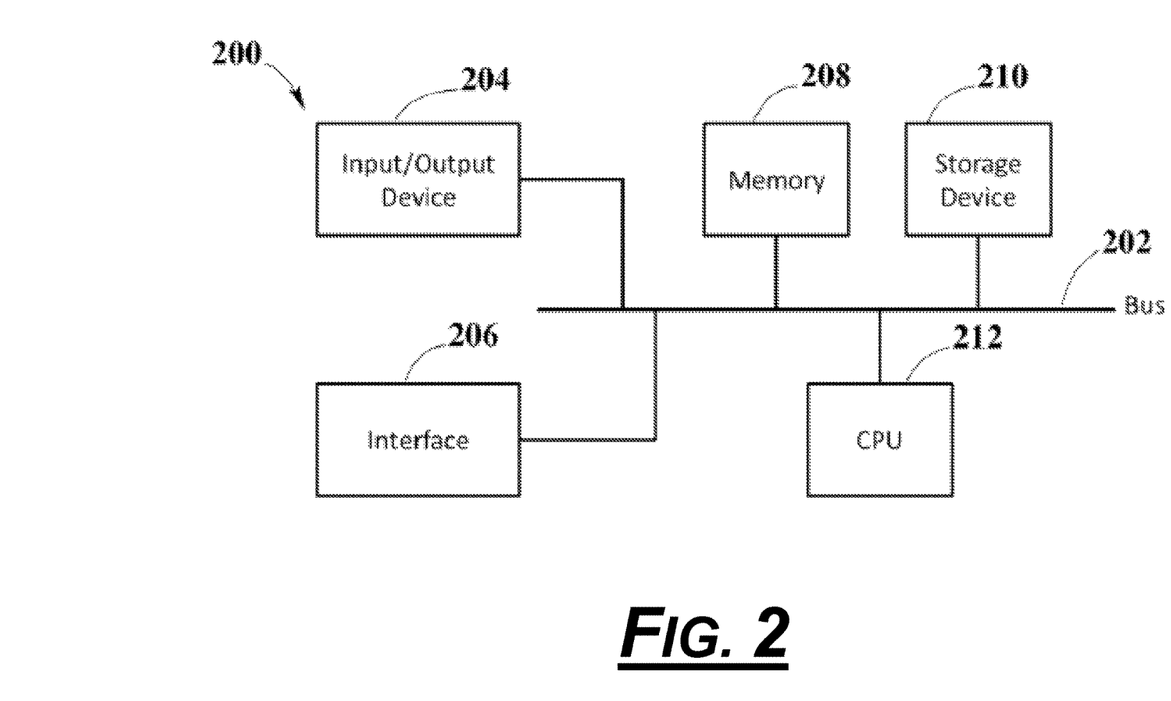
FIG. 2 is a block diagram illustrating an exemplary computing device in which one or more embodiments of the present disclosure operates.

FIG. 2 is a block diagram illustrating an exemplary computing device in which one or more embodiments of the present disclosure operates. According to some aspects of this embodiment, computing device 200 includes a bus 202, an input/output device 204, a communication interface 206, a memory 208, a storage device 210, and a central processing unit 212. In another embodiment, computing device 200 includes additional, fewer, different, or differently arranged components than those illustrated in FIG. 2.

Bus 202 includes a path that permits components within computing device 200 to communicate with each other. Input/output device 204 includes peripherals and/or other mechanisms that enables a user to input information to computing device 200, including a keyboard, computer mice, buttons, touch screens, voice recognition, and biometric mechanisms, among others. Input/output device 204 also includes a mechanism that outputs information to the user of computing device 200, such as, a display, a light emitting diode (LED), a printer, and a speaker, among others. Communication interface 206 includes mechanisms that enables computing device 200 to communicate with other computing devices and/or systems through network connections. Network connections refers to any wire or wireless communication between computers, such as, intranets, local area networks (LAN), virtual private networks (VPN), wireless area networks (WAN), and the internet, among others. Memory 208 includes a random access memory (RAM) or another type of dynamic storage device that stores information and instructions for execution by central processing unit 212. Storage device 210 includes a magnetic and/or optical recording medium, such as read-only memory, flash memory, ferro-electric RAM (F-RAM) hard disks, solid-state drives, floppy disks, and optical discs, among others. Central processing unit 212 includes a microprocessor, an application specific integrated circuit (ASIC), and field programmable object array (FPOA), among others, which may interpret and execute instructions.

According to some aspects of this embodiment, at least one computing device 200, such as a server, a client computing device, a smartphone, a desktop computer, a laptop computer, a tablet computer, a PDA, and/or another type of processor-controlled device that receives, processes, and/or transmits digital data, among others, performs certain operations that may be required for the proper operation of an insurance product processing system. The computing devices performs these operations in response to central processing unit 212 executing software instructions contained in a computer-readable medium, such as memory 208.

The software instructions may be read into memory 208 from another computer-readable medium, such as storage device 210, or from another computing device via communication interface 206. The software instructions contained in memory 208 may cause central processing unit 212 to perform processes that may be described later. Alternatively, hardwired circuitry may be used in place of or in combination with software instructions to implement processes described here. Thus, implementations described here are not limited to any specific combination of hardware circuitry and software.

Figure 3:
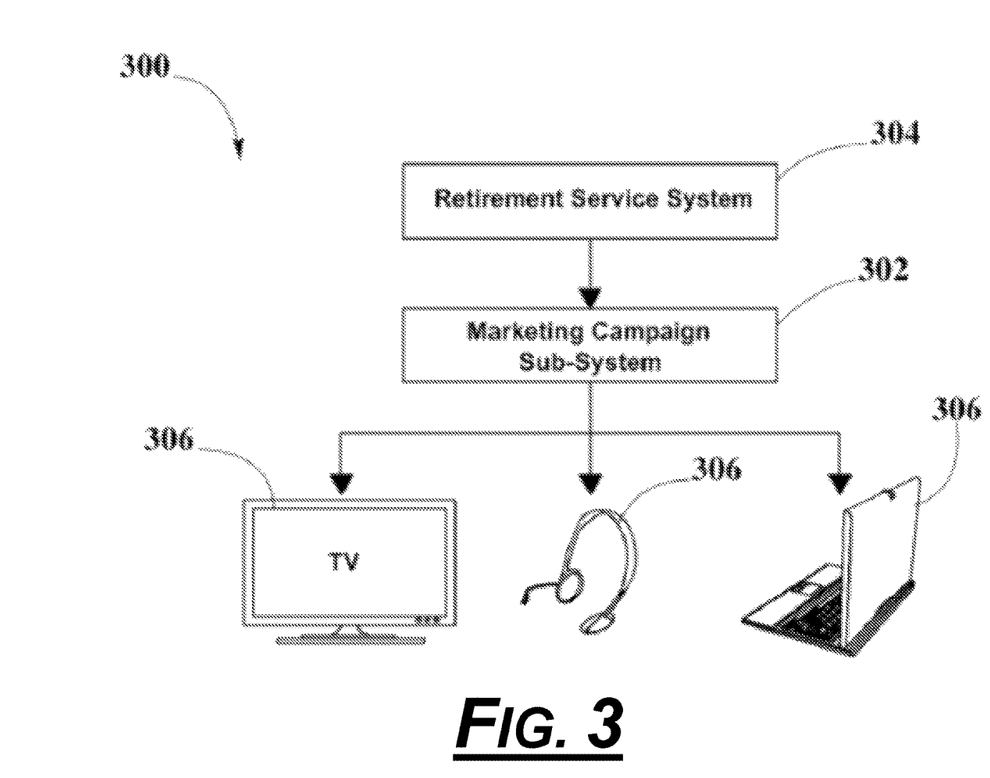
FIG. 3 is a block diagram illustrating a portion of system architecture and pertaining to a marketing campaign subsystem, according to an embodiment.

FIG. 3 is a block diagram illustrating a sub-system architecture and pertaining to a marketing campaign sub-system, according to an embodiment. In FIG. 3, sub-system architecture 300 includes marketing campaign sub-system 302, system for determining retirement protection needs 304, and marketing channels 306. It should be understood that a retirement protection system can include less components, more components, or different components depending on the desired analysis goals. In an example and referring to FIG. 1, said marketing campaign sub-system 302 is implemented as marketing campaign sub-system 116 in system architecture 100. In FIG. 3, marketing campaign sub-system 302 is operatively coupled to and in communication with system for determining retirement protection needs 304 and marketing channels 306.

Marketing campaign sub-system 302 is implemented as one or more computer software modules that include programmatic rules or logic for executing/running different analytic operations for marketing purposes. Marketing campaign sub-system 302 may implement automatic marketing strategies in order to reach each policyholder, potential policyholder, or orphan policyholder and offer products depending on their identified needs and matching products. Marketing campaign sub-system 302 can receive a list of policyholder needs from system for determining retirement protection needs 304 and plan a marketing strategy accordingly. Marketing strategies may be deployed through different marketing channels 306. For example, marketing campaign sub-system 302 may automatically send emails to a specific policyholder, potential policyholder, orphan policyholder or policyholder group and promote products that may satisfy specific needs. Other examples of marketing channels 306 that can be used include automatic telemarketing campaigns and/or targeted advertisement over social media.

Figure 4:
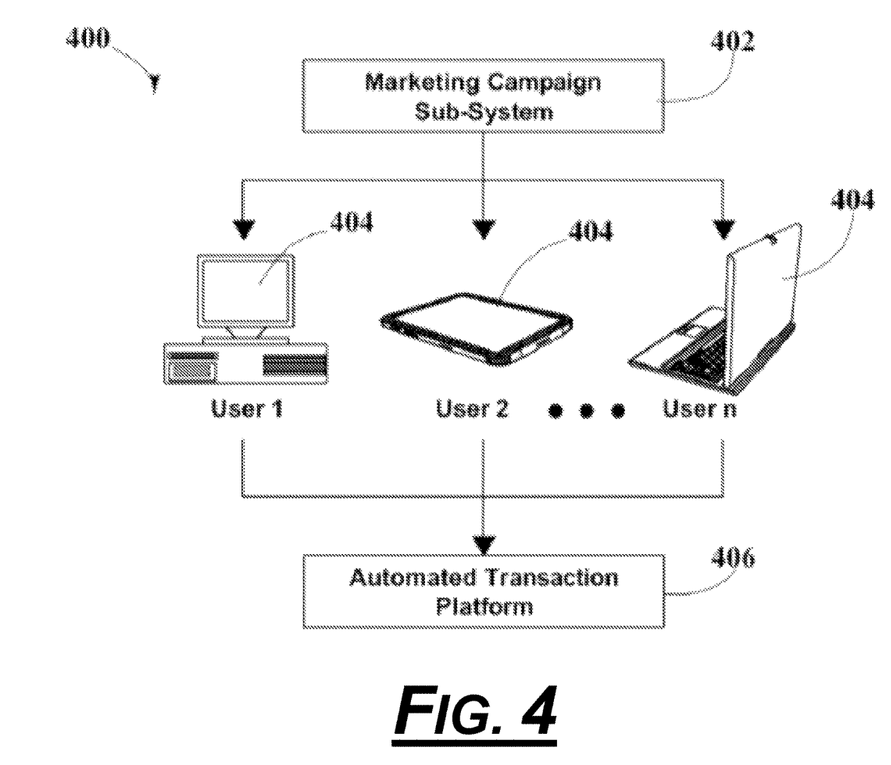
FIG. 4 is a block diagram of another portion of system architecture and pertaining to an automated transaction platform, according to an embodiment.

FIG. 4 is a block diagram of another portion of sub-system architecture and pertaining to an automated transaction platform, according to an embodiment. In FIG. 4, sub-system architecture 400 includes marketing campaign sub-system 402, automated transaction platform 406, and client devices 404. It should be understood that a retirement protection system can include less components, more components, or different components. In an example and referring to FIG. 1, said marketing campaign sub-system 402 is implemented as marketing campaign sub-system 116 and automated transaction platform 406 is implemented as automated transaction platform 118 in system architecture 100. In FIG. 4, marketing campaign sub-system 402 is operatively coupled to and in communication with automated transaction platform 406. Automated transaction platform 406 may communicate with client devices 404. Marketing campaign sub-system 402 through marketing efforts may suggest clients to access automated transaction platform 406 in order to purchase new products advertised.

Automated transaction platform 406 is implemented as one or more computer software modules that include programmatic rules or logic for executing/running different analytic operations for purchasing purposes. Automated transaction platform 406 is implemented in computing devices, such as, for example, desktop computers, laptop computers, server computers among others. Automated transaction platform 406 includes a graphical user interface (GUI) from where customers can view and purchase available products. Customers access the automated transaction platform 406 using different client devices 404. For example, automated transaction platform 406 may be implemented as a website from where customers accesses to a browse and buy the different products offered by an issuing company using a computer.

In another embodiment, automated transaction platform 406 may be implemented as an automated call center from where customers using a telephone can order products advertised.

Figure 5:
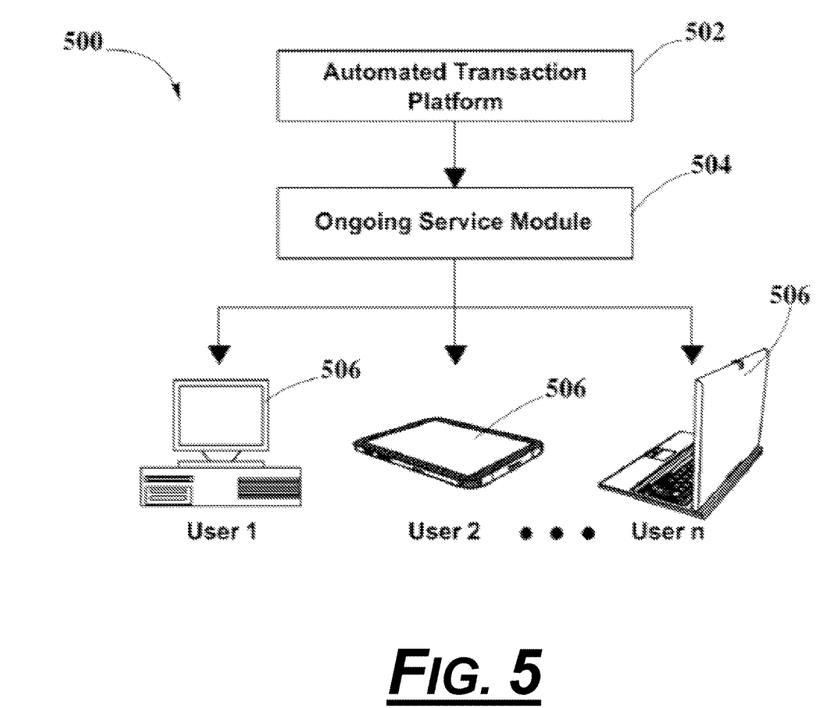
FIG. 5 is a block diagram of yet another portion of system architecture pertaining to an ongoing service module, according to an embodiment.

FIG. 5 is a block diagram of yet another portion of sub-system architecture pertaining to an ongoing service module, according to an embodiment. In FIG. 5, sub-system architecture 500 includes automated transaction platform 502, ongoing service module 504, and client devices 506. It should be understood that retirement protection system can include less components, more components, or different components. In an example and referring to FIG. 1, said automated transaction platform 502 is implemented as automated transaction platform 118 and ongoing service module 504 is implemented as ongoing service module 120 in system architecture 100. In FIG. 5, ongoing service module 504 is operatively coupled to and in communication with automated transaction platform 502. Ongoing service module 504 may communicate with client devices 506.

Ongoing service module 504 is implemented as one or more computer software modules that include programmatic rules or logic for executing/running different analytic operations. Ongoing service module 504 is implemented in any computing device such as, for example, desktop computers, laptop computers, server computers among others. Ongoing service module 504 analyzes if a policyholder or orphan policyholder has been reengaged in business relations with the issuing company. An indication may be that the policyholder has purchased a product using automated transaction platform 502. Ongoing service module 504 also serves as an agent which performs functions such as reminding policyholders about renewals, collecting renewal premiums, ensuring the customer receives the receipts on time and for tax purposes, analyzing purchase activities and any new needs that may be developed from a reengaged policyholder, as well as offering new services or products. Ongoing service module 504 also serves to collect feedback from reengaged policyholders in the form of surveys or frequently asked question services and/or any method of collecting feedback from the reengaged orphan policyholders.

Process Flowchart for Assessing the Protection Needs and Determine Cross-selling Capability of Retirement Service (RS) Policyholders.

A plurality of methods implemented by a retirement protection system are performed by one or more computing devices such as computing device 200. The methods are implemented with components of the exemplary operating environments of FIGS. 1-5. The steps of this exemplary flow diagram of process 600 are embodied in a computer readable medium containing a computer readable code such that the steps are implemented when the computer readable code is executed by a computing device. While the blocks in the disclosed process are shown in a particular order, the actual order may differ. In some embodiments, some steps may be performed in parallel.

Figure 6:
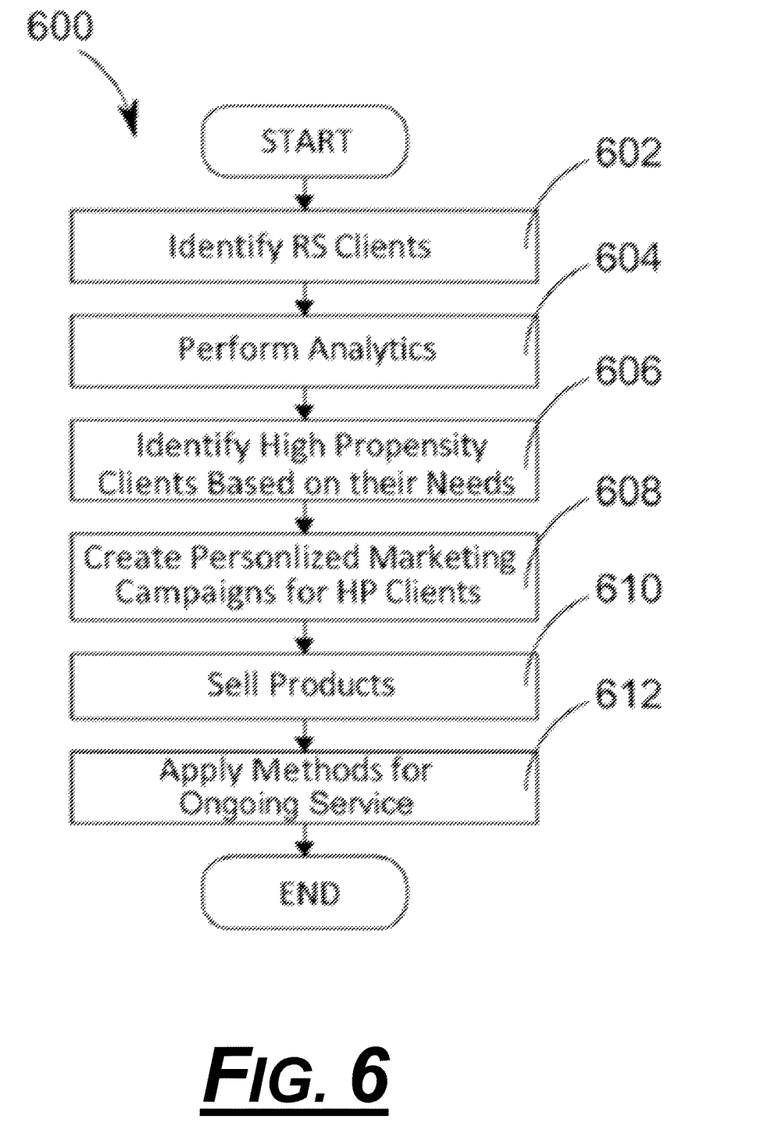
FIG. 6 is a flow diagram of a process to determine the protection needs and cross-selling propensity of retirement services (RS) customers, according to an embodiment.

FIG. 6 is a flow diagram of a process to determine the protection needs and life/annuity cross-selling propensity of RS clients, according to an embodiment. In FIG. 6, process 600 starts at step 602. At step 602, a retirement service system selects a sample of RS clients (e.g., policyholders) from a RS client data source. In one embodiment, retirement service system is implemented as a software module running on computing device 200. The retirement service system is responsible for retrieving, managing and analyzing data coming from the RS client data source. Process 600 advances to step 604.

At step 604, the retirement service system conducts advanced analytics using data processing algorithms in order to determine life insurance and retirement needs for the sample of RS clients selected, as well as, the propensity of RS clients for purchasing cross-selling life/annuity products.

In some embodiments, the retirement service system retrieves information about RS clients and existing life/annuity products from an internal and an external database. In some embodiments, the internal database includes data related to insurance or financial products of the insurance company as well as RS clients. Examples of insurance or financial products include cross-selling life/annuity products as well as other insurance services or products. In some embodiments, the external database includes data related to clients which can be obtained from outside data sources such as for example, the internet, social networks, financial regulatory institutions, social security agencies, medical institutions, and the like.

In some embodiments, the retirement service system determines if the existing life and annuity products stored in the internal database satisfy the insurance needs of the sample of RS clients selected. In one embodiment, the retirement service system determines the needs of RS clients for purchasing existing life/annuity products according to specific characteristics of the sample of RS clients. For example, the need for a particular life/annuity product may be determined according to RS client's characteristics such as demographics, professional background, medical and financial history. In some embodiments, the retirement service system assigns a value to each existing life/annuity product depending on the need exhibited by each RS client. For example, a young person with a family and no life insurance may be assigned a higher value for a life insurance product as compared to a young person without a family. In another example, a middle-age person with no retirement plan may be assigned a higher value for an annuity product as compared to a middle-age person having a retirement plan at work.

In some embodiments, the retirement service system determines the amount of life insurance that a particular RS client may need. In these embodiments, retirement service system can determine the amount of life insurance that particular RS client needs based on data such as income, amount of debt, number of family dependents, savings, monthly family expenditure, and the like. In other embodiments, retirement service system can also take into account trends or fluctuations in inflation and interest rates in order to approximate the amount of life insurance that a particular RS client may need. In one example, retirement service system may estimate a higher amount of life insurance for a person having a family with of 5 children and with monthly expenditures of $15,000 as compared to a person having a family with only 1 child and with monthly expenditures of less than $5,000.

In some embodiments, the retirement service system determines the amount of annuity or pension that a particular RS client may need. In these embodiments, the retirement service system determines the amount of annuity that a particular RS client needs based on age, gender, postal code, occupational background, monthly expenditures, income, retirement plan, medical history, marital status, and the like. Further to these embodiments, the retirement service system approximates the lump sum required to fund an annuity to meet certain retirement needs. In an example, the retirement service system determines a higher annuity requirement for a RS client that does not have an existing 401k plan. In another example, the retirement service system determines a higher annuity requirement for a RS client having considerable monthly expenditures for covering a long-term disease.

In some embodiments, the retirement service system determines the propensity of RS clients for purchasing existing life/annuity products. In one embodiment, the retirement service system estimates the propensity of RS clients for purchasing existing life/annuity products according to life events. Examples of life events include the birth of a child, birthday, marriage, accidents, diseases, death of relatives, and the like. Further to this embodiment, the retirement service system calculates the propensity of RS clients for buying cross-selling life/annuity products based on statistical models applied to data collected from the internal and external databases. In some embodiments, the retirement service system retrieves personal data from the external database to assist in calculation of the propensity of RS clients for buying cross-selling life/annuity products. For example, a young person with a family and experiencing the birth of a child may be assigned a higher value for propensity to purchase a life insurance product as compared to a young person who does not experience the birth of a child. In another example, a middle-age person experiencing a birthday may be assigned a higher value for propensity to purchase an annuity product as compared to a middle-age person not experiencing a birthday at that point of time.

In some embodiments, the retirement service system determines the propensity of RS clients with life insurance policies to acquire annuity products. Yet in another embodiment, the retirement service system may determine the propensity of RS clients having annuity products to buy life insurance. Process 600 advances to step 606.

At step 606, the retirement service system identifies high propensity (HP) clients based on a correlation between the need and propensity for purchasing life/annuity products. In some embodiments, high propensity clients corresponds to RS clients having a high need for life/annuity products and a high propensity for purchasing life/annuity products.

As a way of example, a young professional having an annuity product may have more propensity to buy a life insurance product when he/she marries and has a child. In another example, a middle-age professional having life insurance and planning for retirement may have more propensity for purchasing an annuity product.

In some embodiments, the retirement service system offers cross-selling life/annuity products to high propensity clients with other benefits, such as annuity with long-term care insurance, annuity with an LTC feature/rider, annuity with life insurance, and exchange one annuity for another, among others. Process 600 advances to step 608.

At step 608, a marketing campaign module implements and refines direct customized personal marketing models to create and run marketing campaigns for the identified high propensity target clients. In one embodiment, the marketing campaign module can select the list of identified high propensity clients (from the RS clients) and their associated cross-selling annuity or life products to develop experimental approaches to refine marketing campaign models. Further to this embodiment, the marketing campaign module develops different types of campaigns such as email, telemarketing, interviews, conferences, and surveys among others. For example, emails may be sent automatically to the identified high propensity clients in order to offer a product (e.g. cross-selling annuity/life products) that satisfies the needs for that particular customer. In another example, an automatic telemarketing campaign may call identified high propensity clients by phone in order to offer cross-selling annuity/life products. In other embodiments, the marketing campaign also includes survey calls from where customer feedback is requested and received from the identified high propensity clients. Process 600 advances to step 610.

At step 610, the retirement service system provides access to an automated transaction platform where the high propensity clients can purchase recommended life/annuity products. In one embodiment, life/annuity products can be recommended by the retirement service system according to correlation between the need and propensity for purchasing life/annuity products. In an example, the retirement service system recommends a life insurance product of the appropriate amount to young professional who owns an annuity and who does not own a life insurance product, when he/she experiences the birth of child. In another example, the retirement service recommends an annuity product of the appropriate type to a middle-age professional who owns a life insurance product and who does not own an annuity product, when she/he experiences a birthday (and thinks about retirement). Process 600 advances to step 612.

At step 612, an ongoing service module tracks high propensity clients who purchase a recommended or available cross-selling annuity/life product. In some embodiments, the ongoing service module tracks high propensity clients who purchase a product and provide ongoing service to these clients. In these embodiments, ongoing service includes activities such as reminding policyholders about renewals, collecting renewal premiums, ensuring that the customer receives the receipts on time, tracking purchase activities and developing needs, as well as offering new services or products. In some embodiments, ongoing service is implemented through automatic emails, phone-calls, and surveys, among others. In some embodiments, the ongoing service module is configured to provide ongoing service according to a client service schedule. For example, the client service schedule can establish the periodic delivery of emails to high propensity clients to offer new insurance products. In other embodiments, the ongoing service module identifies specific RS clients and adds them to the sample of RS clients obtained by the retirement service system at step 602. Process 600 ends.

By executing process 600 through the exemplary operating environments shown in FIGS. 1-5, big data analytics and data mining techniques can be implemented for a more efficient and faster processing of larger data sets. In this way, efficiencies are created by providing the financial or insurance company with ways to automatically determine cross-selling capability of life, DI, of annuity products.

Through the implementation of one or more software modules used to determine and identify the protection needs, high propensity clients, and develop strategies to cross-sell annuity/life products to those clients, the retirement protection system allows users to perform large work such as heavy calculations and time consuming analysis in a more efficient manner than other approaches such as manual work performed by humans.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:

executing, by a server, an analytical model using a K-nearest neighbor collaborative filtering technique to select a first subset of a set of users;

collecting, by the server, a set of data records associated with the first subset of users by scanning at least one social networking database and at least one internal database;

determining, by the server using the data scanned from the at least one social networking database and the internal database, one or more characteristics associated with each user within the first subset of users;

determining, by the server using the data scanned from the at least one social networking database and the internal database, a first value corresponding to a life insurance or retirement product need for each user within the first subset of users;

generating, by the server, a multi-dimensional matrix corresponding to a propensity for purchasing at least one selected life insurance or retirement product that satisfies the life insurance or retirement product need for each user within the first subset of users, wherein the server assigns a second value to each user within the first subset of users based on the respective user's determined propensity for purchasing the at least one selected life insurance or retirement product, and wherein each user is positioned within the multi-dimensional matrix in accordance with the respective user's assigned first and second values;

selecting, by the server based on a relative position of each user within the multi-dimensional matrix, a second subset of users that have a highest value of correlation between the first and the second values, the second subset of users corresponding to users with a highest correlation between the propensity of purchasing and life insurance or retirement product needs;

automatically generating, by the server, a customized electronic mail for each user within the second subset of users, the electronic mail comprising a hyperlink corresponding to an automated transaction platform website displaying the at least one selected life insurance or retirement product in accordance with the life insurance or retirement product need for each user within the second subset of users and based upon the propensity for purchasing the at least one selected life insurance or retirement product for each user within the second subset of users;

transmitting, by the server, the electronic mail to a computing device associated with each user within the second subset of users; and training, by the server using a stochastic gradient descent algorithm, the analytical model for future life insurance or retirement product analysis.

2. The method according to claim 1, further comprising:

continuously monitoring, by the server, electronic activities associated with each user within the second subset of users.

3. The method according to claim 1, further comprising:

automatically initiating, by the server, a phone session with at least one user within the second subset of users.

4. The method according to claim 1, wherein each data record comprises information including demographics, professional background, medical history, and financial history.

5. The method according to claim 1, further comprising:

calculating, by the server, an amount of life insurance for each of the users within the first subset of users based on data in the internal database.

6. The method according to claim 5, wherein the data in the internal database includes at least one of income, amount of debt, number of family dependents, savings, and monthly family expenditure.

7. The method according to claim 5, wherein calculating the amount of life insurance comprises determining a trend in inflation.

8. The method according to claim 5, wherein calculating the amount of life insurance comprises determining a trend in interest rates.

9. The method according to claim 5, wherein the data comprises at least one of age, gender, postal code, occupational background, monthly expenditures, income, retirement plan, medical history, and marital status.

10. The method according to claim 1, further comprising:

calculating, by the serve for each user within the second subset of users, a lump sum required to fund an annuity.

11. The method according to claim 1, wherein the propensity determined by the server comprises estimating the propensity at a plurality of predicted life events.

12. The method according to claim 11, wherein the plurality of predicted life events include at least one of birth of a child, birthday, marriage, accidents, diseases, and death of a relative.

13. The method according to claim 1, further comprising automatically granting, by the server, access to the automated transaction platform website for each user within the second subset of users to purchase the at least one selected life insurance or retirement product.

14. The method according to claim 1, further comprising tracking, by the server, users in the subset of the set of users that have purchased the at least one selected life insurance or retirement product.

15. The method according to claim 1, further comprising automatically generating, by the server, correspondence to each user in the subset of the set of users based on a renewal.

* * * * *